United States Patent [19]
Allen

[11] Patent Number: 6,078,753
[45] Date of Patent: Jun. 20, 2000

[54] CAMERA WITH COMBINATION FLASH REFLECTOR AND VIEWFINDER MIRROR

[75] Inventor: Loretta E. Allen, Hilton, N.Y.

[73] Assignee: Eastman Kodak Company, Rochester, N.Y.

[21] Appl. No.: 09/225,948

[22] Filed: Jan. 6, 1999

[51] Int. Cl.[7] .......................... G03B 15/03; G03B 13/02
[52] U.S. Cl. ...................... 396/176; 396/177; 396/178; 396/383; 396/386
[58] Field of Search ...................................... 396/176, 177, 396/178, 348, 373, 383, 384, 385, 386

[56] References Cited

U.S. PATENT DOCUMENTS

| | | | |
|---|---|---|---|
| 4,279,488 | 7/1981 | Hines | 396/373 |
| 4,392,732 | 7/1983 | Pizzuti | 396/373 |
| 4,723,140 | 2/1988 | Whiteside et al. | 396/373 |

*Primary Examiner*—Eddie C. Lee
*Attorney, Agent, or Firm*—Roger A. Fields

[57] ABSTRACT

A camera having a viewfinder for viewing a subject to be photographed, and a flash unit for illuminating the subject which is supported for movement between an operative position in which the flash unit faces the subject and a storage position in which the flash unit does not face the subject, is characterized in that the viewfinder has an image-reflecting mirror that is arranged on the flash unit for movement with the flash unit to reflect an image of the subject when said flash unit is moved from the storage position to the operative position.

9 Claims, 6 Drawing Sheets

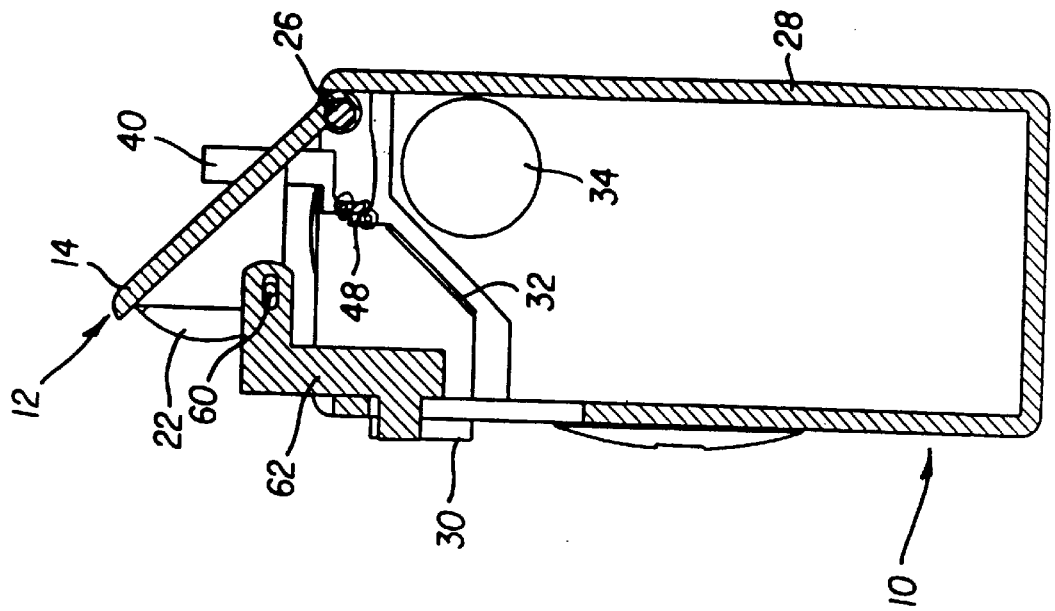
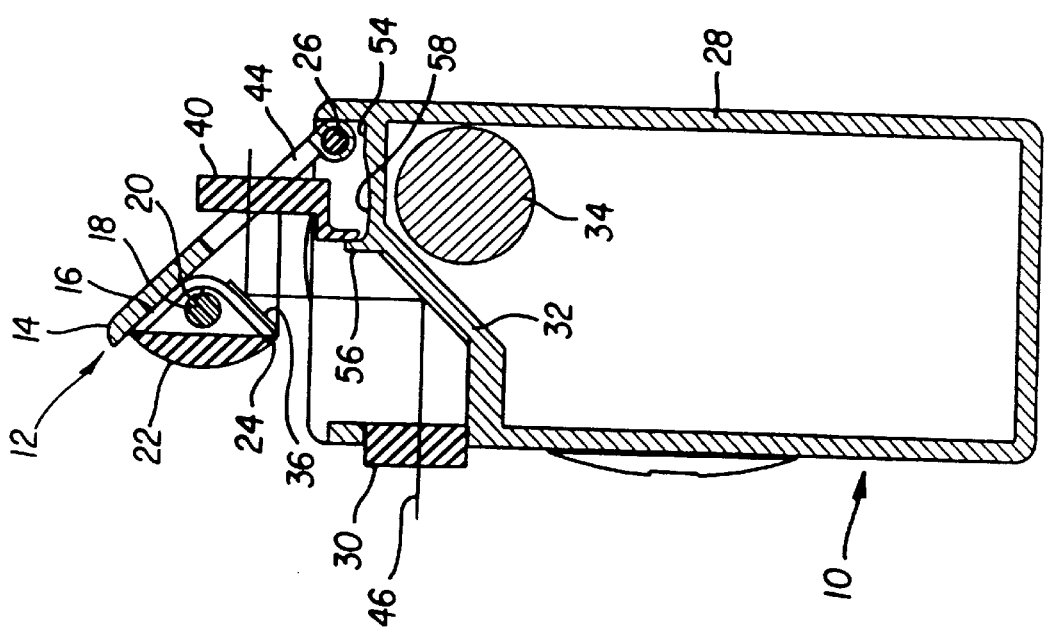

CAMERA WITH COMBINATION FLASH REFLECTOR AND VIEWFINDER MIRROR

FIELD OF THE INVENTION

The invention relates generally to the field of photography, and in particular to cameras. More specifically, the invention relates to a camera with a combination flash reflector and viewfinder mirror.

BACKGROUND OF THE INVENTION

When taking a picture it is necessary to know not only in what direction to aim the camera but also how much of the subject to be photographed will be included in the picture. For this reason practically every camera has a viewfinder of some kind.

Cameras that have a deployable flash unit for illuminating the subject have become quite popular in recent years. In this type of camera, the flash unit is supported for pivotal or translating movement between an operative position in which the flash unit faces the subject and a storage position in which the flash reflector is folded or collapsed to be hidden.

An example of integrating a deployable flash unit and a viewfinder in a camera is disclosed in prior art U.S. Pat. No. 5,212,510 issued May 18, 1993. Here, when the flash unit is flipped up from a storage position facing the camera to an operative position facing the subject, a pair of front and rear viewing lenses that constitute the viewfinder are each flipped up from storage to operative positions.

SUMMARY OF THE INVENTION

A camera comprising a viewfinder for viewing a subject to be photographed, and a flash unit for illuminating the subject which is supported for movement between an operative position in which the flash unit faces the subject and a storage position in which the flash unit does not face the subject, is characterized in that:

the viewfinder has an image-reflecting mirror that is arranged on the flash unit for movement with the flash unit to reflect an image of the subject when said flash unit is moved from the storage position to the operative position.

BRIEF DESCRIPTION OF THE DRAWINGS

FIGS. 6–8 are elevation sections views of the camera as shown in FIG. 5.

DETAILED DESCRIPTION OF THE INVENTION

Figure 1:
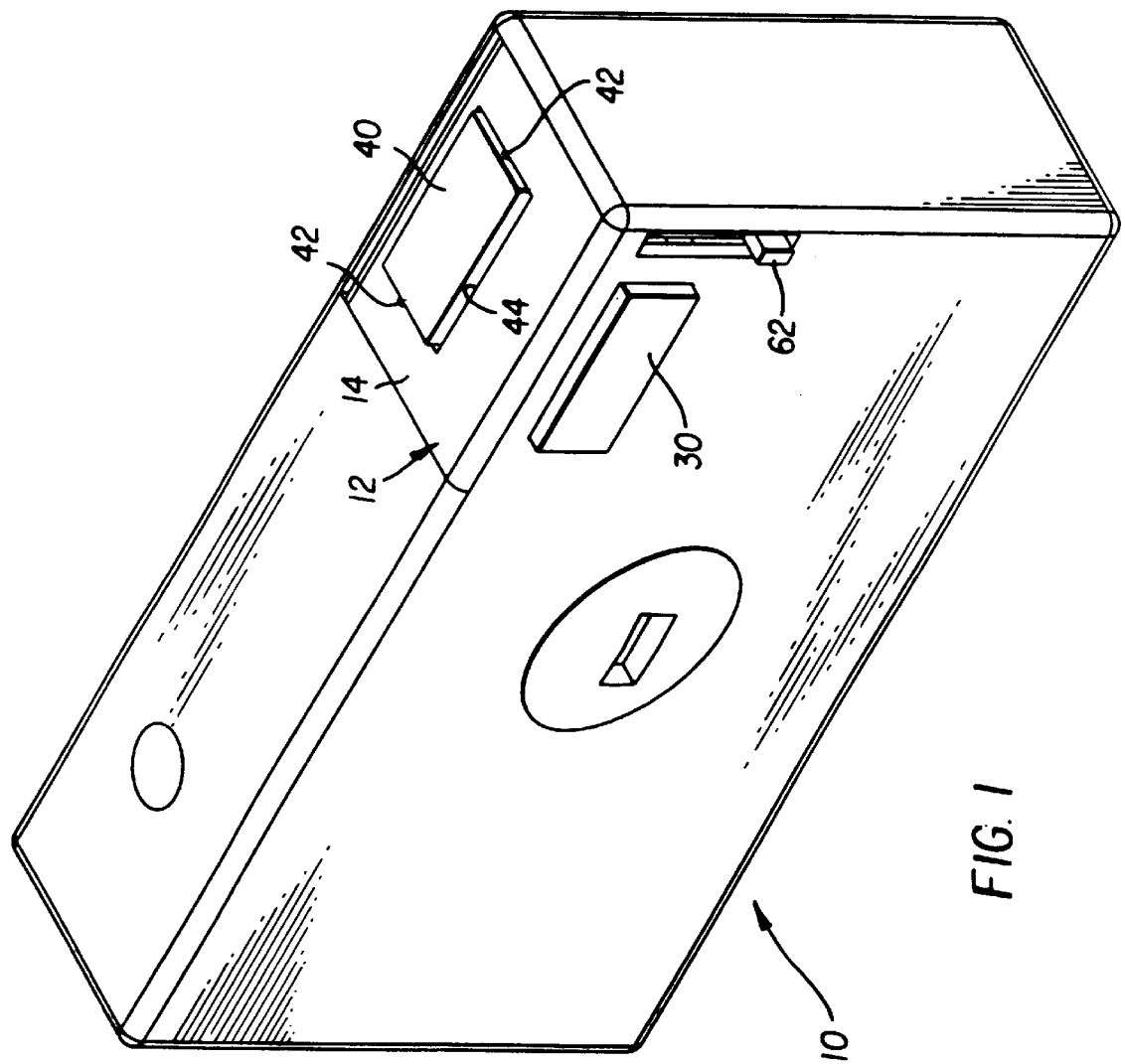
FIG. 1 is a front perspective view of a camera with a combination flash reflector and viewfinder mirror according to a preferred embodiment of the invention, showing a flash unit in a storage position and the viewfinder mirror in a non-viewing position.

The invention is disclosed as being embodied preferably in a flash-type camera. Because the features of a flash-type camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–8 show a flash-type camera 10 with a flash unit 12 for illuminating a subject to be photographed. The flash unit 12 has a top cover-support 14 to which is attached a through-shaped flash reflector 16. A flash tube 18 is centered inside the flash reflector 16, adjacent a concave inner surface 20 of the flash reflector, and a transparent or translucent flash cover-lens 22 is provided over a front open end 24 of the flash reflector. The top cover-support 14 is pivotable about a fixed pivot pin 26 on a camera body part 28 to move the flash unit 12 between an operative (erect) position shown in FIGS. 5–8 and a storage (folded or collapsed) position shown in FIGS. 1–4. In the operative position of the flash unit 12, the flash reflector 16, the flash tube 18 and the flash cover-lens 22 face the subject to be photographed to illuminate the subject. In the storage position of the flash unit 12, the flash reflector 16, the flash tube 18 and the flash cover-lens 22 are hidden beneath the top cover-support 14. Thus, in the storage position, the flash reflector 16, the flash tube 18 and the flash cover-lens 22 do not face the subject to be photographed and therefore cannot illuminate the subject.

A front viewing lens 30 and an angled mirror 32 are each fixed on the camera body part 28. The front viewing lens 30 forms an image of the subject, and the angled mirror 32 is spaced behind the front viewing lens to reflect the image that is formed by the front viewing lens. See FIGS. 2 and 6. When the flash unit 12 is in its storage position, the flash cover-lens 22 and the flash reflector 16 are located partly between the front viewing lens 30 and the angled mirror 32. This provides a compact design.

A battery 34 for powering the flash tube 18 is located beneath the flash unit 12.

The flash reflector 16 preferably has an integral reflecting portion that constitutes a reflecting mirror 36 on a flat portion of a convex outer surface 38 of the flash reflector. Alternatively, the reflecting mirror 36 can be a separate mirror element on the flat portion of the convex outer surface 38 of the flash reflector 16. The reflecting mirror 36 is arranged parallel to the angled mirror 32 when the flash unit 12 is in its operative position, to reflect the image of the subject that is reflected by the angled mirror, and is arranged non-parallel to the angled mirror when the flash unit is in its storage position, to prevent its use . See FIGS. 6 and 2.

Figure 3:
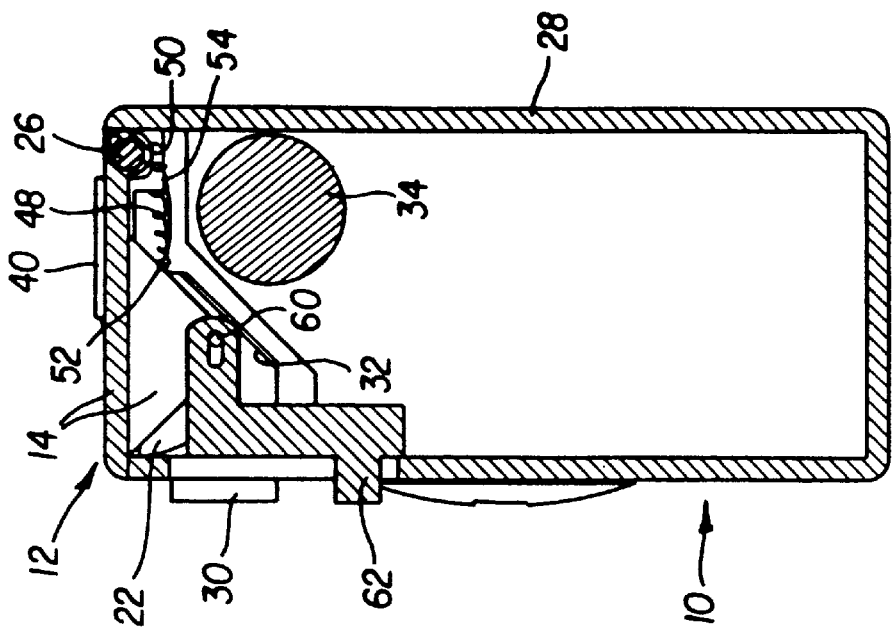
FIGS. 2, 3 and 4 are elevation section views of the camera as shown in FIG. 1.
Figure 4:
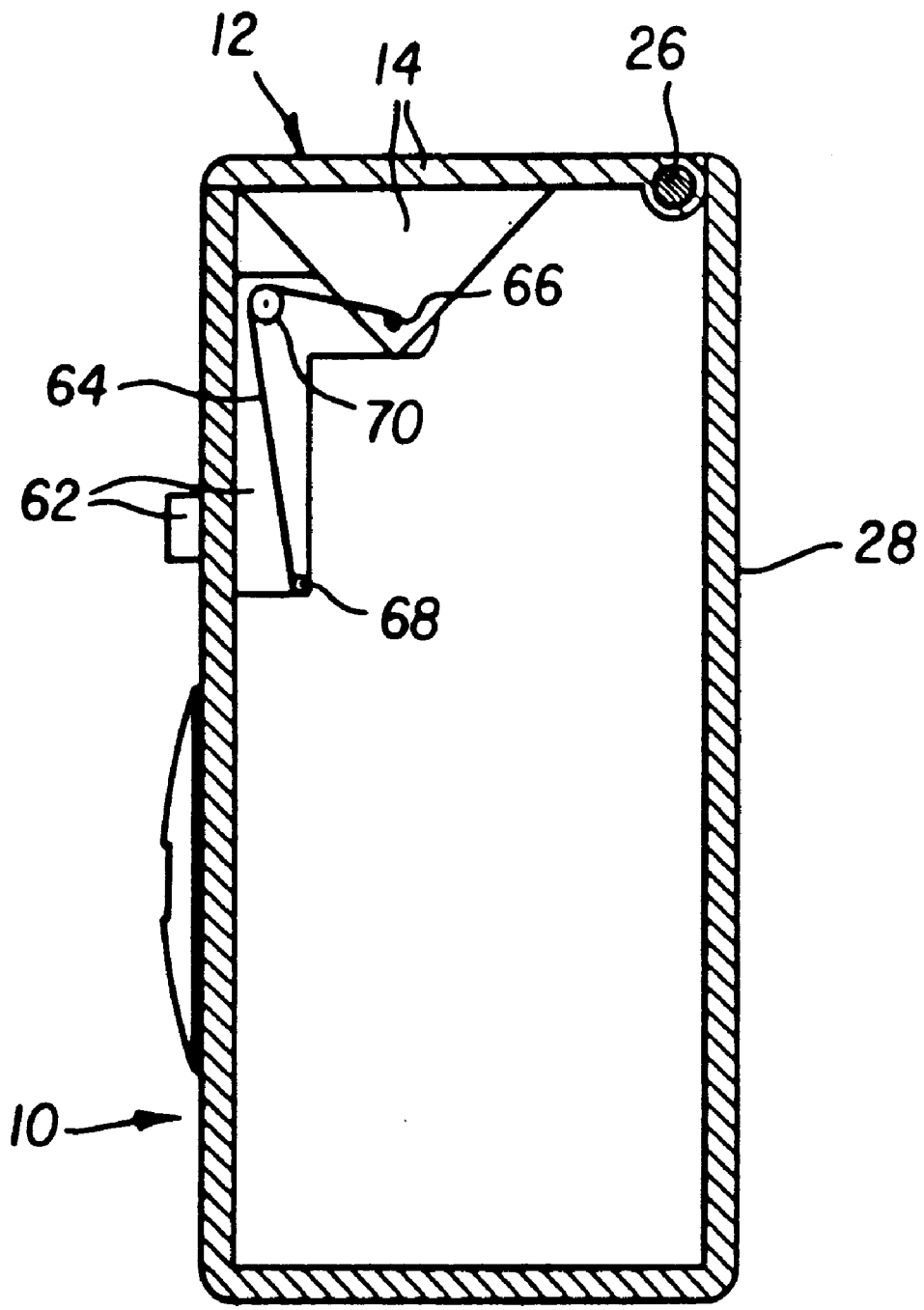

A rear viewing lens (eye-lens) 40 is pivotable about a fixed pivot pin 42 on the top cover-support 14 between a viewing position shown in FIGS. 6 and 7 and a non-viewing position shown in FIGS. 3 and 4 as the flash unit 12 is pivoted between its operative and storage positions. In the non-viewing position, the rear viewing lens 40 is folded or collapsed substantially within a hole 44 in the top cover-support 14 to prevent its use. In the viewing position, the rear viewing lens 40 is unfolded or erected from the hole 44 in the top cover-support 14 to view the image of the subject that is reflected by the reflecting mirror 36. FIG. 6 shows an optical viewing axis 46 for the front viewing lens 30, the angled mirror 32, the reflecting mirror 36, and the rear viewing lens 40, when the flash unit 12 is in its operative position, Thus, the front viewing lens 30, the angled mirror 32, the reflecting mirror 36, and the rear viewing lens 40 constitute a foldable or collapsible type viewfinder for viewing the subject to be photographed.

Figure 2:
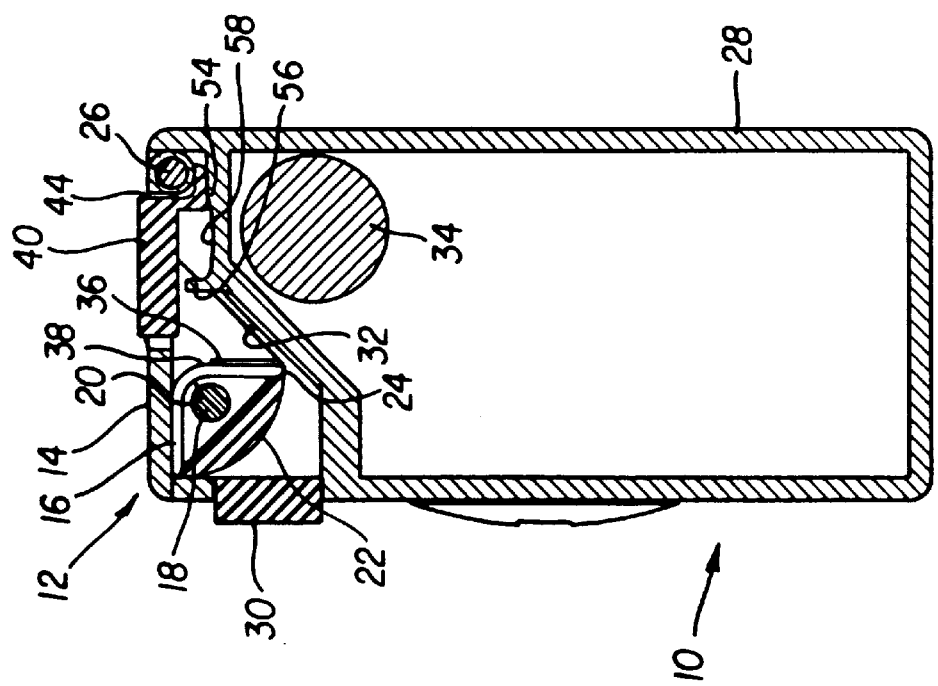
Figure 5:
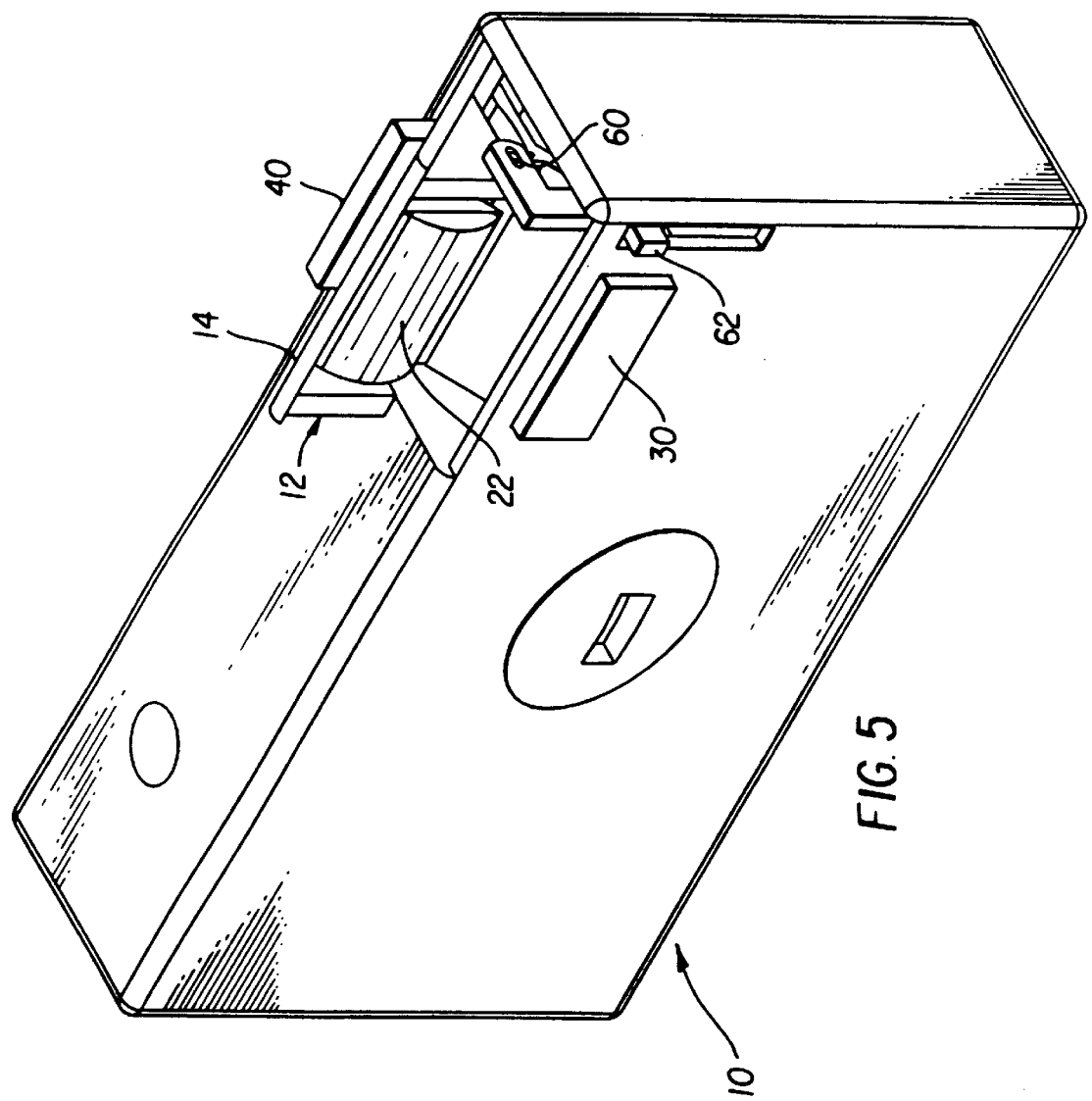
FIG. 5 is a front elevation view of the camera, showing the flash unit in an operative position and the viewfinder mirror in a viewing position.
Figure 8:
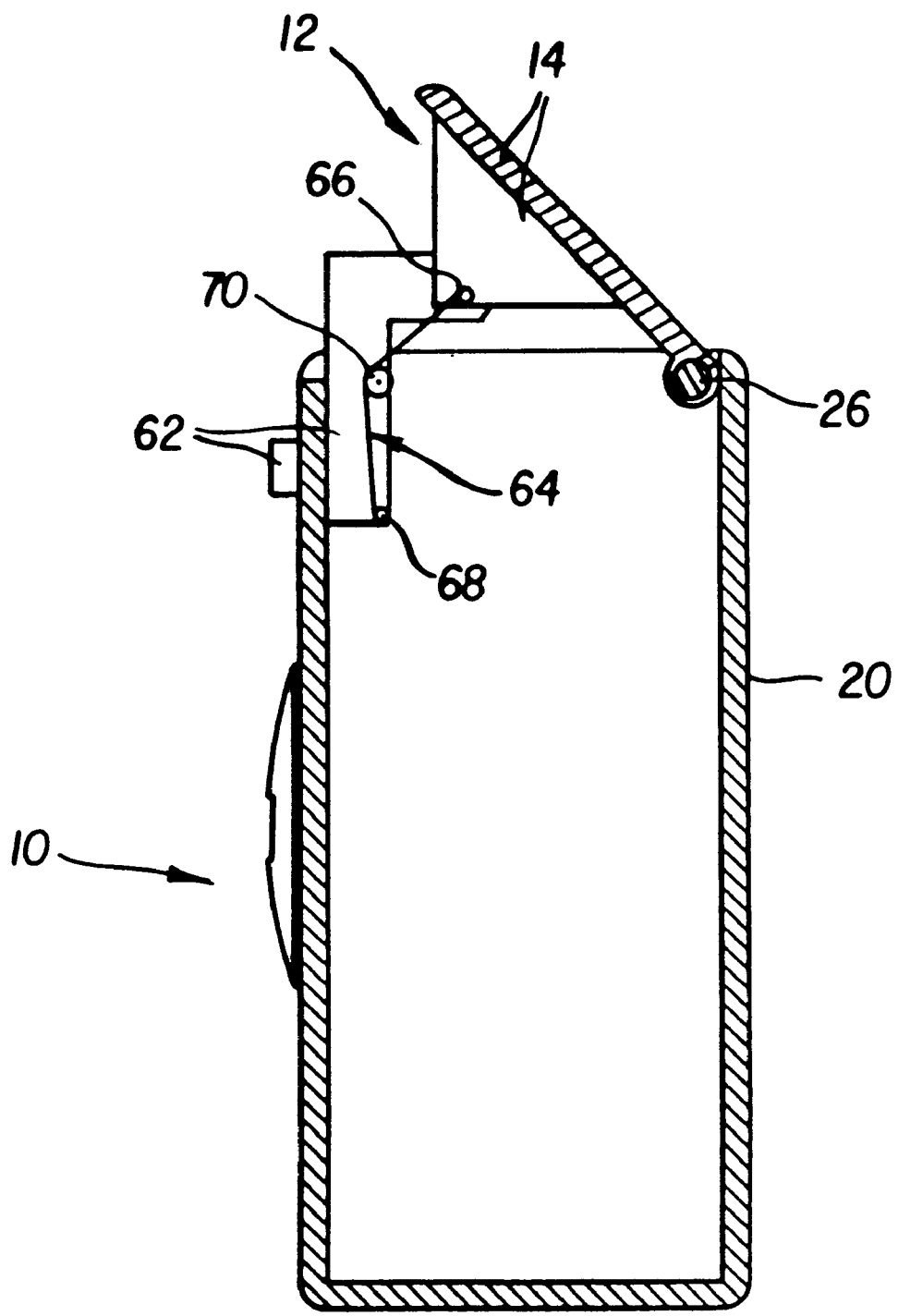

A helical tension spring 48 has one end 50 connected to the rear viewing lens 40 and an opposite end 52 connected to the camera body part 28 to urge the rear viewing lens to pivot from its non-viewing position shown in FIGS. 1–3 to its viewing position shown in FIGS. 5–7. A stop 54 on the camera body part 28 prevents the rear viewing lens 40 from being pivoted from its non-viewing position to its viewing position when the flash unit 12 is in its storage position. See FIG. 2. When the flash unit 12 is pivoted from its storage position to its operative position, the rear viewing lens 40 is lifted from the stop 54 which allows the tension spring 48 to begin to pivot the rear viewing lens from its non-viewing position to its viewing position. As shown in FIG. 6, a stop 56 on the camera body part 28 prevents the rear viewing lens 40 from being pivoted any farther by the tension spring 48 once the rear viewing lens is in its viewing position. When the flash unit 12 is returned to its storage position, a cam profile 58 between the two stops 54 and 56 on the camera body part 28 pivots the rear viewing lens 40 back to its non-viewing position.

A pin-in-slot connection 60 between an actuator slide member 62 and the top cover-support 14 enables manual movement of the actuator slide member in opposite directions to initiate movement of the flash unit 12 to its operative and storage positions. A known over-center spring 64 has one end 66 connected to the flash unit 12, an opposite end 68 connected to the actuator slide member 62, and a free center 70, to pivot the flash unit 12 to its operative and storage positions after the actuator slide member 62 is moved in the corresponding direction.

The invention has been described with reference to a preferred embodiment. However, it will be appreciated that variations and modifications can be effected by a person of ordinary skill in the art without departing from the scope of the invention.

PARTS LIST 10. camera
12. flash unit
14. top cover-support
16. flash reflector
18. flash tube
20. concave inner surface
22. flash cover-lens
24. front open end
26. pivot pin
28. camera body part
30. front viewing lens
32. angled mirror
34. battery
36. reflecting mirror
38. convex outer surface
40. rear viewing lens
42. pivot pin
44. hole
46. optical viewing axis
48. tension spring
50. spring end
52. spring end
54. stop
56. stop
58. cam profile
60. pin-in-slot connection
62. actuator slide member
64. over-center spring
66. spring end
68. spring end
70. spring center

What is claimed is:

1. A camera comprising a viewfinder with at least one viewing lens for viewing a subject to be photographed, and a flash unit for illuminating the subject which is supported for movement between an operative position in which said flash unit faces the subject and a storage position in which said flash unit does not face the subject, is characterized in that:

said flash unit has a trough-shaped flash reflector and a flash tube centered within said flash reflector; and said viewfinder has a reflecting mirror that is arranged on said flash reflector for said reflecting mirror to reflect an image of the subject towards said viewing lens only when said flash unit is in the operative position.

2. A camera as recited in claim 1, wherein said flash reflector has an inner surface and an outer surface, said flash tube is located adjacent said inner surface, and said reflecting mirror is on said outer surface.

3. A camera as recited in claim 2, wherein said outer surface of said flash reflector has at least an integral reflecting portion that constitutes said reflecting mirror.

4. A camera as recited in claim 1, wherein said viewing lens is a rear eye-lens, and said flash unit supports said rear eye-lens for movement with the flash unit when the flash unit is moved between the operative and storage positions and for movement relative to said flash unit between a viewing position in which said reflecting mirror can reflect an image of the subject towards said rear eye-lens when the flash unit is in the operative position and a non-viewing position in which said reflecting mirror cannot reflect an image of the subject towards said rear eye-lens when the flash unit is in the storage position.

5. A camera as recited in claim 4, wherein said flash unit has a hole into which said rear eye-lens is folded to the non-viewing position when the flash unit is in the storage position and out of which the rear eye-lens is unfolded to the viewing position when the flash unit is in the operative position.

6. A camera as recited in claim 1, wherein said viewing lens is a rear eye-lens, said viewfinder has a front viewing lens, and a fixed mirror is arranged between said front viewing lens and said reflecting mirror when said flash unit is in the operative position to reflect an image of the subject towards said reflecting mirror.

7. A camera comprising a viewfinder with a pair of front and rear viewing lenses through which a subject to be photographed is viewed, and a flash unit for illuminating the subject which is supported for movement between an operative position in which said flash unit faces the subject and a storage position in which said flash unit cannot illuminate the subject, is characterized in that:

a fixed mirror is angled behind said front viewing lens to reflect an image of the subject; and a reflecting mirror is arranged on said flash unit to move from being non-parallel to parallel to said fixed mirror, to reflect an image of the subject towards said rear viewing lens, when said flash unit is moved from the storage position to the operative position.

8. A method in a camera of readying a viewfinder for viewing a subject to be photographed and for readying a flash unit for illuminating the subject, comprising:

moving the flash unit from a storage position in which the flash unit cannot illuminate the subject to an operative position in which the flash unit can illuminate the subject; and moving a reflecting mirror on an outer surface of a trough-shaped flash reflector of the flash unit with the flash unit, for the reflecting mirror to reflect an image of the subject towards a rear viewing lens of the viewfinder when the flash unit is moved from the storage position to the operative position.

9. A method as recited in claim 8, wherein the rear viewing lens is moved with the flash unit when the flash unit is moved from the storage position to the operative position and is moved relative to the flash unit from a non-viewing position in which the subject cannot be viewed to a viewing position in which the subject can be viewed as the flash unit is moved from the storage position to the operative position.

* * * * *